UNITED STATES PATENT OFFICE.

CARRIE R. LAMAN, OF MEADVILLE, PENNSYLVANIA.

LUBRICATING-OIL.

SPECIFICATION forming part of Letters Patent No. 282,648, dated August 7, 1883.

Application filed August 18, 1882. (No specimens.)

*To all whom it may concern:*

Be it known that I, CARRIE R. LAMAN, of Meadville, Crawford county, Pennsylvania, have invented a new and useful Improvement in Lubricating-Oil; and I do declare that the following is a full and exact description thereof, reference being had to the composition as a whole, and also to each of the marked ingredients.

The lubricating-oil is formed by mixing petroleum, either raw or refined, with any of the other natural lubricants, (as sperm, lard, or tallow, &c.,) paraffine, rosin, beeswax, lime, and salt, to which is added an alkali to clarify and hold the mixture in solution.

To prepare the lubricating-oil, take one gallon of petroleum, either raw or refined, one-half pound of lard, or whichever of the natural lubricants preferred, one-half pound rosin, one-half pound paraffine, and two ounces of beeswax. Place in a suitable vessel over a slow fire. Unite at a low heat. When thoroughly mixed, add one pint lime-water and one-half pound of salt. Stir well. Then add one ounce alkali, as potash, carbonate of soda, sal-soda, or any other convenient alkali. Stir and skim until it is clarified. Then drain the mixture from the impurities that have settled. The oil may be made lighter or heavier, as desired, according to the amount of solids used—beeswax, paraffine, and rosin. In the cheaper grades of oil the beeswax may be withheld. The quantity of separate materials is not restricted to a particular amount, sufficient being used to produce the desired consistency and purity.

I am aware that petroleum-oil, tallow, beeswax, soda, and salt, that lime, paraffine, and rosin, that tallow, paraffine, neat's-foot oil, castor-oil, and potash, and that petroleum, animal fat, and lime-water have all been used in the combinations stated to form a lubricating compound; but I am not aware that the compound composed of the elements described in the foregoing specification has ever been used.

What I claim as my invention is—

A lubricating-oil composed of petroleum, lard, or tallow, paraffine, rosin, beeswax, lime, salt, and an alkali, compounded in substantially the proportions stated, for the purpose set forth.

C. R. LAMAN.

Witnesses:
C. BELLE LAMAN,
HELEN A. MILLIMAN.